Patented May 8, 1934

1,957,973

UNITED STATES PATENT OFFICE 1,957,973

METHOD OF CASE HARDENING

Ernest C. Moffett, Woodbridge, N. J., assignor to American Cyanamid Company, New York, N. Y., a corporation of Maine No Drawing. Application May 23, 1929, Serial No. 365,554

5 Claims. (Cl. 148—15)

This invention relates to case hardening, and more particularly to the use of a molten bath of inorganic salts having a cyanide dissolved therein and into which bath the metal articles to be hardened are immersed for the production of a case thereon.

The present invention is based upon the well-known method of case hardening which utilizes a bath of salts such as a mixture of sodium chloride and calcium chloride to which is periodically added a small amount of calcium cyanide, usually crude calcium cyanide, either in powder or in flake form. Such a bath has been found to be particularly effective in the production of a deep case on steel articles in a short time with the use of a small amount of the calcium cyanide in the bath.

Although the method as heretofore practiced is very effective, it is subject to a number of disadvantages arising from the manner in which it is carried out. For example, the powder or flake calicum cyanide has a tendency to float on the surface of the bath with the result that the cyanide dissolves very slowly because of the relatively small area of contact and the relatively low temperature prevailing at the point of contact. Some decomposition of the calcium cyanide takes place at the surface of the bath with the liberation of fumes containing cyanogen compounds which are injurious and unpleasant to the workmen. The case hardening operation taking place at a temperature of about 1500° F. or higher, causes rapid burning of some of the floating calicum cyanide with attendant formation of froth on the surface and consequent overflowing of the contents of the bath. Further, there is usually excessive formation of carbon on the surface, all of which leads to a large waste of valuable cyanide and renders the bath less valuable for the case hardening operation. Therefore, the case hardening results are apt to be somewhat non-uniform since maintaining a uniform concentration of calcium cyanide in the bath under these conditions is obviously a difficult problem.

Because of the tendency of the calcium cyanide to burn and otherwise decompose on the surface of the bath, it becomes necessary to use much more than the minimum quantity of calcium cyanide calculated to do the work required. Calcium cyanide is very unstable in the air and the finer the state of sub-division the more rapid is its decomposition with the liberation of hydrocyanic acid gas which is lost in the air. Also, it is difficult to measure out accurately or to weigh the proper amounts of calcium cyanide in the powder or flake form for addition to the case hardening bath.

I have made an exhaustive study of the above outlined difficulties and disadvantages of the use of ordinary powder or flake calcium cyanide and have succeeded in overcoming the same by a very simple expedient. In practicing my invention I produce calcium cyanide in the form of lumps or blocks of relatively large size as compared to the flakes of calcium cyanide heretofore produced by the usual methods of making calcium cyanide. For instance, in Landis Patent No. 1,359,257, dated Nov. 16, 1920, a method is outlined whereby molten calcium cyanide is produced which is quickly chilled in thin layers so as to avoid reversion of the calcium cyanide to cyanamide. I have found that I may take the molten calcium cyanide of Landis, pour the same into molds of substantial area and thickness with means for rapidly cooling the same whereby I obtain relatively large lumps or blocks of calcium cyanide without any substantial amount of reversion. In other words, I have so modified the Landis procedure as to produce calcium cyanide in the form of lumps well adapted for use in the case hardening bath.

For the purpose of case hardening, I find it is highly desirable that the blocks or lumps be of substantially uniform size and weight and I generally produce lumps varying in weight from 1 to 16 oz. with a preference for lumps weighing from 2 to 5 oz. The weight, of course, may vary with the size of the lumps and the density or porosity thereof.

In operating a bath for case hardening I may melt a mixture of anhydrous inorganic salts consisting of two parts by weight of calcium chloride and one part by weight of sodium chloride, and when molten I add an initial amount of 4 oz. cyanide lumps equivalent to one-half of one percent of the weight of the bath. This places the bath in condition for operation and it is maintained at a suitable case hardening temperature, say, about 1575° F. Thereafter I add one-half of one percent of lump cyanide per hour to keep up the desired cyanide concentration.

Low carbon steel articles are immersed in the described bath for the required length of time, generally from ten minutes to three or four hours, giving a depth of case ranging from .005 to .035 inches. By the use of calcium cyanide in lump form I am able to operate commercially with hourly additions of one-half of one percent of a crude calcium cyanide averaging approximately 50 percent Ca(CN)₂, whereas when flake or powdered cyanide was used it was necessary to add at least twice this amount of the case hardening ingredient. Lump calcium cyanide does not float on the surface of the bath as is the case with the flake or powdered form, but sinks immediately below the surface of the bath and thereby avoiding all danger of decomposition and of oxidation. Under these circumstances the total amount of carbon and nitrogen in the cyanide is available and effective for the case hardening operation.

By the use of lumps, the concentration of dissolved calcium cyanide in the bath is uniform resulting in a uniform depth of case on the articles being case hardened. It becomes a very simple procedure to add the desired number of lumps of definite size and weight to the bath quickly and without waste of time for weighing or measuring the calcium cyanide. This makes it possible for even the most inexperienced workmen to add properly and at the right time the desired amount of calcium cyanide to maintain the necessary minimum concentration for effective case hardening.

Although I have described my invention setting forth a specific embodiment of the operation thereof, it is obvious that I am not limited to the details above set forth. For example, the composition of the bath, the amount of cyanide added, the temperature and time of case hardening, all may be varied as desired. The calcium cyanide lumps may be of any suitable shape such as rectangular, spherical or other solid geometrical or irregular form. The calcium cyanide which I use is not necessarily that prepared in accordance with the Landis process, since any other source of calcium cyanide is equally as good for my purposes. For example, I may prepare my lumps from the calcium cyanide produced by dissolving calcium carbide in liquid hydrocyanic acid. I need not form the lumps or blocks by chilling calcium cyanide, but I may take a cyanide in powdered or flake form and use a binder of anhydrous character, such as molten salts, sugar, urea, dicyanamid, pitch or many others as briquetting agents in the formation of lumps of uniform weight, density and size. Pelleting without binders by the use of suitable molds and pressure may also be utilized to prepare my lumps.

These and other variations may be made in the details of my invention without departing from the spirit and scope thereof, except as set forth in the claims appended hereto.

What I claim is:

1. In the method of case hardening involving a molten bath of inorganic salts and calcium cyanide, the step which comprises adding thereto calcium cyanide in the form of unconfined lumps having substantial area and substantial thickness, said lumps being of such relative density that they float below the surface of the bath.

2. In the method of case hardening involving a molten bath containing case hardening ingredients, the step which comprises adding to the molten bath masses of calcium cyanide of a density greater than that of the molten bath.

3. In the method of case hardening involving a molten bath containing case hardening ingredients, the step which comprises adding to the bath masses of calcium cyanide of a density such that said masses remain submerged in the bath.

4. In the method of case hardening involving a molten bath containing case hardening ingredients, the step which comprises adding to the molten bath masses of calcium cyanide of a density greater than that of the molten bath, said masses of calcium cyanide being in the form of lumps from 1 to 16 ounces in weight.

5. In the method of case hardening involving a molten bath containing case hardening ingredients, the step which comprises adding to the bath lumps of cast calcium cyanide of a density greater than that of the molten bath.

ERNEST C. MOFFETT.